United States Patent [19]

Korse et al.

[11] Patent Number: 5,792,485
[45] Date of Patent: Aug. 11, 1998

[54] PELLETING PRESS

[76] Inventors: Theodorus H. Korse, Rietvoornsloot 21, 2427 CJ Zoetermeer; Hendrik Beumer, Langhoven 36, 6721 SK Bennekom, both of Netherlands

[21] Appl. No.: 845,644

[22] Filed: Apr. 25, 1997

Related U.S. Application Data

[63] Continuation of Ser. No. 662,090, Jun. 13, 1996, abandoned, which is a continuation of Ser. No. 533,608, Sep. 25, 1995, abandoned, which is a continuation of Ser. No. 221,991, Apr. 1, 1994, abandoned, which is a continuation of Ser. No. 838,234, filed as PCT/NL90/00118, Aug. 16, 1990, published as WO91/02644, Mar. 7, 1991, abandoned.

[30] Foreign Application Priority Data

Aug. 21, 1989 [NL] Netherlands ............... 8902105

[51] Int. Cl.[6] .................................................. B29C 47/52
[52] U.S. Cl. .................... 425/150; 264/40.5; 264/143; 425/168; 425/331; 425/365; 425/DIG. 230
[58] Field of Search ..................... 425/145, 331, 425/365, 374, DIG. 230, 335, 363, 168, 150; 264/140, 141, 143, 40.5, 40.7

[56] References Cited

U.S. PATENT DOCUMENTS

| 1,467,883 | 9/1923 | Sizer | 425/DIG. 230 |
|---|---|---|---|
| 3,207,091 | 9/1965 | Cunningham | 425/168 |
| 3,307,501 | 3/1967 | Wenger | 425/DIG. 230 |
| 4,029,459 | 6/1977 | Schmiedeke | 425/365 |
| 4,498,856 | 2/1985 | Botha et al. | 425/DIG. 230 |
| 4,770,621 | 9/1988 | Groebli et al. | 425/DIG. 230 |
| 4,798,529 | 1/1989 | Klinner | 425/DIG. 230 |
| 4,838,779 | 6/1989 | Vries | 425/DIG. 230 |
| 5,152,215 | 10/1992 | Wetzel | 425/145 |

FOREIGN PATENT DOCUMENTS

| 555203 | 3/1923 | France . |
| 1274122 | 10/1961 | France . |
| 1568226 | 3/1968 | France . |
| 3806945 | 3/1988 | Germany . |
| 2130959 | 11/1982 | United Kingdom . |

*Primary Examiner*—Patrick Ryan
*Assistant Examiner*—Joseph Leyson
*Attorney, Agent, or Firm*—Brooks & Kushman P.C.

[57] ABSTRACT

A pelleting press for pressing from a powdery, granular and/or pasty material compacted rod-shaped pieces of said material, comprising a die (1) with one or more rotatable rolls (6) co-operating therewith each having an axis (5) supported in such a manner that it is situated in a plane through the axis (3) of the die (1) and a gap (9) is defined between the die (1) and the or each roll (6), further comprising means for supplying the material to be pressed towards the or each gap (9), and driving means for moving the die (1) and the or each roll (6) in respect of the material supplied to the or each gap (9), all this in such a manner that the supplied material when moving in the gap between the die and a roll is compacted and is pressed through the apertures (2), the support of the die and/or the or each roll being so that the gap height is adjustable, the driving means being adapted for driving the die as well as the or each roll, and the velocity of at least the die or the each roll being independently variable.

6 Claims, 2 Drawing Sheets

PELLETING PRESS

RELATED APPLICATION

This application is a continuation of application Ser. No. 08/662,090 filed on Jun. 13, 1996, now abandoned, which is a continuation of application Ser. No. 08/533,608 filed on Sep. 25, 1995, now abandoned, which is a continuation of application Ser. No. 08/221,991 filed on Apr. 1, 1994, now abandoned, which is a continuation of Ser. No. 07/838,234 filed on Apr. 17, 1992, now abandoned, which is a 371 of PCT/NL90/00118 filed on Aug. 16, 1990.

FIELD OF INVENTION

The invention relates to a pelleting press for pressing from a powdery, granular and/or pasty material compacted rod-shaped pieces of the material.

BACKGROUND OF INVENTION

Such pelleting presses are known in several forms, having either a disc-shaped and substantially flat die with a generally vertical axis, rolls having generally a horizontal axis co-operating therewith, or having a cylindrical die with an axis which is substantially parallel to the axis of the roll co-operating with said die. In some presses the axes of the roll and the die are not mutually perpendicular or parallel, but include an angle. The axis of the roll is, then, generally situated in a plane through the axis of the die. Sometimes the rolls are supported in a fixed yoke. As to the drive of such presses, there are presses having a driven die, and presses having a driven roll. With all these drive types, the material to be pressed is entrained by the driven element. The not-driven element moves along with the movement of the material. In some presses, however, the rolls are not supported in a fixed yoke but in a rotatable yoke. The drive will, then, take place by means of the yoke, and the die will generally not rotate. In the known devices, the gap height and the drive velocity will be chosen so that the material to be processed will be pressed as well as possible in respect of the quality of the pressed material pieces (generally called pellets), the production capacity and the energy consumption of the press, but this is done purely experimentally and only as far as allowed by the restricted control possibilities. It has appeared then to be impossible to obtain always an optimal adaptation to fluctuations in the quality, in particular the composition, the internal friction, humidity content and the like, of the material to be processed. In the case of large deviations, for instance so much slip between the material and the die or roll can occur that the pressure in the gap will strongly decrease, and the material will no longer be pressed through the die apertures. Then smearing of the material will take place. The press will get jammed, unless the production flow will be decreased fast enough, and/or the quality of the material can be adapted, and/or other emergency measures can be taken for preventing jamming.

BRIEF SUMMARY OF INVENTION

It is an object of the invention to provide a press of the kind mentioned above not having these objections or only to a considerable lesser degree, and allowing an optimal adaptation to the material to be processed. To that end the press according to the invention has the characteristics including the driving means for driving the die as well as the or each roll and the velocity of at least the die or the or each roll being independently variable.

In contrast to the known presses, in the instant pelleting press, the die as well as the one or more rolls (and in the case of a rotatable yoke also the yoke) will be driven according to the invention, so that at the gap the velocity of at least the die or the one or more rolls is independently adjustable. Thereby the material compressed in the gap between the die and a roll will not be subjected at one side (i.e. at the side of the roll or the die), but at both sides (i.e. at the roll and the die) to shear stresses. At a substantially constant pressure distribution this will mean that the shear stress will be substantially lower than in the case of driving only the roll or only the die, so that the slip boundary will be reached less early accordingly, and the operation can be controlled better. Thereby a larger adjustability of the gap height can be obtained, which will contribute to obtaining an optimal adaptation to fluctuations in the material to be processes, so that, on the one hand, smearing will occur less frequently, and, on the other hand, the choice of the composition will be subjected to less limitations. The lower slip sensibility also means that a shorter running-in period during adjustment of the press can be obtained. The better adjustability of the gap height also means that the production capacity, as far as not restricted by the required minimum hardness and wear resistance and/or other desired qualities of the pressed material, can be considerably increased, so that a possibly favourable result can be obtained.

BRIEF DESCRIPTION OF THE DRAWINGS

The invention will be elucidated below by reference to a drawing, showing in.

BRIEF DESCRIPTION OF PREFERRED EMBODIMENTS

Figure 1:
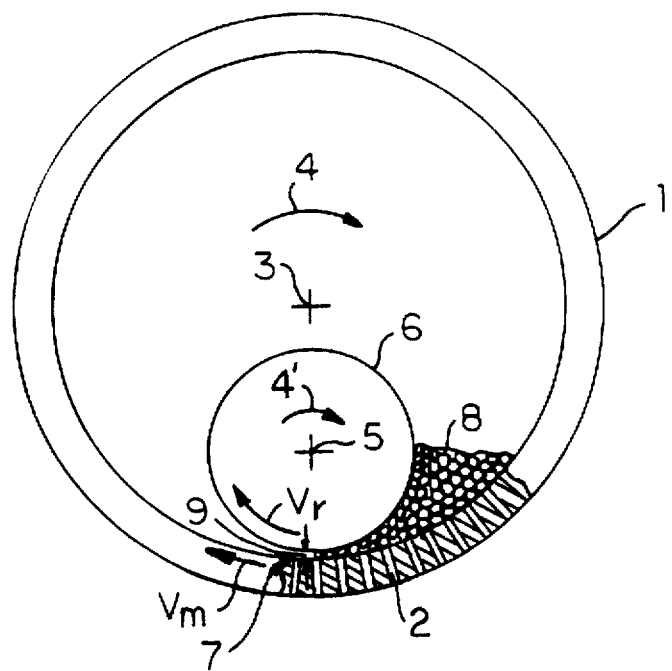
FIG. 1 a diagrammatic representation of the general structure of a pelleting press of known design for elucidating the invention.
Figure 2:
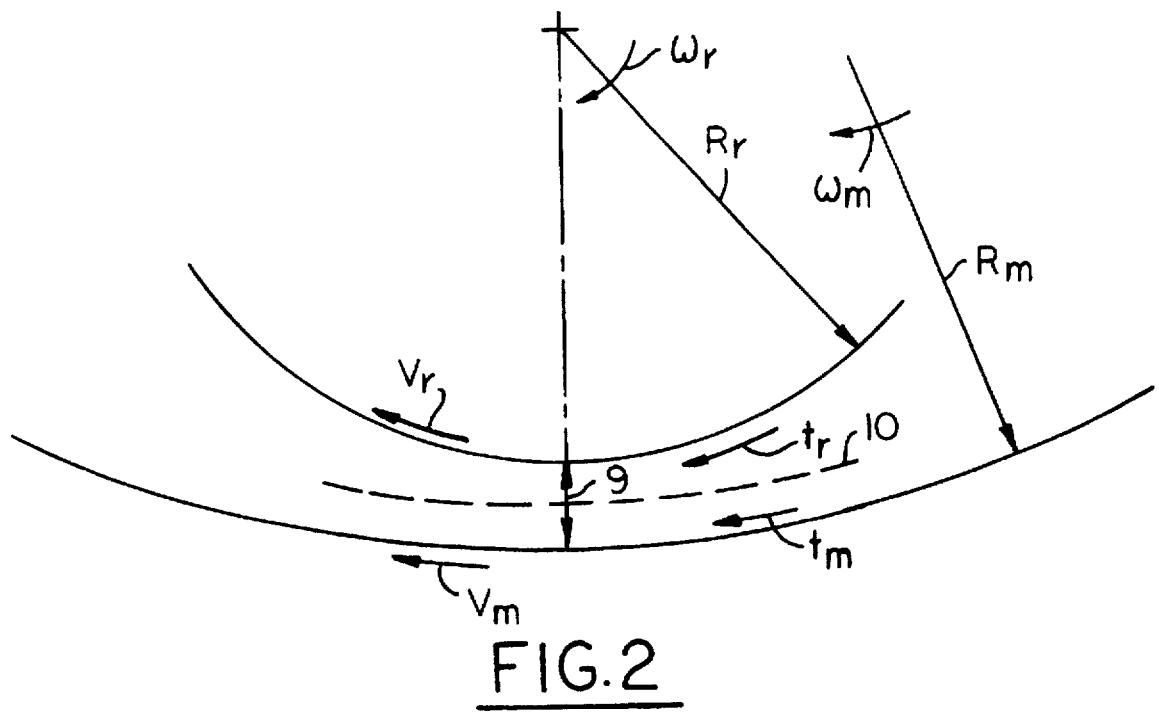
FIG. 2 a diagrammatic representation of the gap between the die and roll in a press according to the invention, with the velocities and shear stresses occurring therein.

In FIG. 1 a known pelleting press has been diagrammatically shown. This press comprises a hollow cylindrical drum or die 1, provided with a large number of apertures 2 which are generally directed tranversely to the die surface. This die is rotatably supported on an axis 3, and can be rotated by means of driving means, diagrammatically indicated by an arrow 4, with a desired angular velocity, leading to a velocity $v_m$. This velocity relates to the inner side of the die in the point of smallest gap height. Inside this die, a roll 6 rotatably supported on an axis 5 which is parallel to the axis 3 and laterally displaced in respect thereof, the generatrices of said roll being parallel to those of the die 1. Between the die and the roll a relatively narrow gap 7 is present. The smallest distance between the die and the roll is the minimum gap height 9 (FIG. 2). The gap height can be adjustable.

Inside the die 1, the material 8 to be pressed is continuously supplied, and is, when rotating the die 1, entrained as a consequence of the friction between the die 1 and this material, the latter being compacted in the gap 7. The pressure then occuring will cause this material to be pressed outwards through the apertures 2 in the form of compressed pieces, generally called pellets. As a consequence of the movement of the material in the gap, the non-driven roll will rotate with a velocity $v_r$. This velocity relates to the circumference of the roll in the point of lowest gap height.

It will be clear that also various rolls can be arranged inside the die 1, and, instead of driving the die 1, also the roll 6 can be driven, and then the non-driven die will be entrained. In another known construction, the die does not move, and a yoke is rotatably driven. The rolls are then supported in said rotating yoke. Also the die 1 and/or the rolls 6 can have a conical shape. It is also possible to provide the apertures 2 in the rolls 6, but this is generally not practical.

Therefore, a velocity gradient will occur transversely to the roll axis 5. If, however, too much slip will occur between the material 8 and the surface of the die 1 and/or the roll 6, this will lead to a certain smearing of the material in the gap, and to a reduction of the pressure, the consequence thereof being a reduced extrusion of the material through the apertures 2. A small internal slip in the material can, indeed, influence the quality of the material in a favourable way since, thereby, a better coherence between the particles of the material and a greater hardness and wear resistance and/or other qualities of the pressed material pieces can be obtained, but the operation will become instable in an increasing degree and, therefore, less controllable, so that the risk that the press will jam will strongly increase.

In these known presses the adaptation to different factors is difficult, and often not optimally possible. If the quality of the material to be pressed will change or fluctuate during a current pressing operation, because of changes of the internal friction as a consequence of, for instance, variations in the humidity or fat content, it is generally not possible to perform a supplementary adjustment during the operation leading to an optimal pressing result. Also the character of the material to be pressed will now allow an optimal or economically feasible pressing operation within the adaptation and adjustment possibilities of the press.

The invention is based on the insight that the difficulties mentioned above can be avoided by a better adjustability and control, or can be considerably reduced. To that end also the roll 6 will be driven, as shown in FIG. 1 by an arrow 4', so that also the roll will exert a driving friction force on the material 8 in the gap 7. The entraining force required for generating the required pressure in the gap 7 will then act at both sides on the material, so that the critical friction force at which slip is beginning to occur will occur less early, and virtually never at a suitable choice of the velocities and the gap height.

FIG. 2 diagrammatically shows these transverse forces. The die 1 having a radius $R_m$ is driven at an angular velocity $\omega_m$ that leads to a velocity $v_m$. The roll 6 having a radius $R_r$ is driven at an angular velocity $\omega_r$ that leads to a velocity $v_r$. The shear stresses $\tau_m$ and $\tau_r$ exerted on the material by the die and roll are not only dependent on the rotation angle, but are also a function of the velocities which are mutually indepently adjustable.

It has now appeared that the possibility of slip will be at a minimum if the shear stresses $\tau_m$ and $\tau_r$ at opposite sides of the gap are substantially equal. From mechanical considerations it will appear that, then, in the curved plane 10 substantially in the centre of the gap 7 the shear stress will be zero. This plane is called a neutral plane. The pressure generated in the compressed material will then, in addition to other variables, depend on the sum of these shear stresses and the gap height. This pressure will then be selected as high as possible, but is limited by the condition that uncontrollable slip should be avoided under all circumstances.

It will now be clear that by selecting suitable driving velocities for the die 1 and the roll 6, and in particular of the ratio of these velocities, and furthermore of a suitable height of the gap 7, an optimal adjustment for a given material can be obtained which, in particular during the operation of the press, can be adapted. In particular the running-in period of the press can be considerably accelerated thereby, so that less time and material will be lost. By adjusting a small velocity difference between the die and the roll, a given controllable slip and internal shear in the material can be generated, so that the quality of the material in the gap can be favourably influenced while avoiding the risk of the press becoming jammed.

The last-mentioned equality of the shear stresses $\tau_m$ and $\tau_r$ can be obtained in the case of fixedly mounted rolls 6 and die 1 as such by an adapted adjustment of the rotational velocities. In the general case of a yoke rotatable round an axis 3 and rolls 6 supported in this yoke on the other hand, the drive of the rolls 6 in respect of the yoke, the drive of the yoke in respect of the stationary structure, and the drive of the die in respect of the stationary structure, should be selected so that the shear stresses $\tau_m$ and $\tau_r$ are substantially equal. This can be obtained by a correct adjustment of the velocities of the roll and the die at the gap in question.

Figure 3:
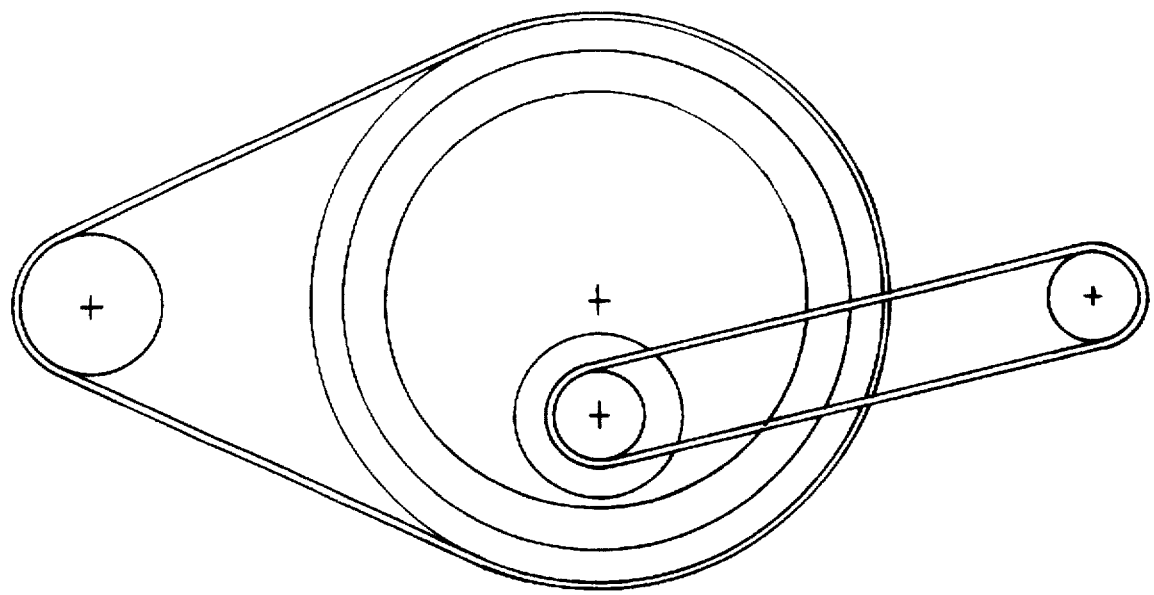
FIGS. 3 and 4 diagrammatic representations of the drive of such a press.
Figure 4:
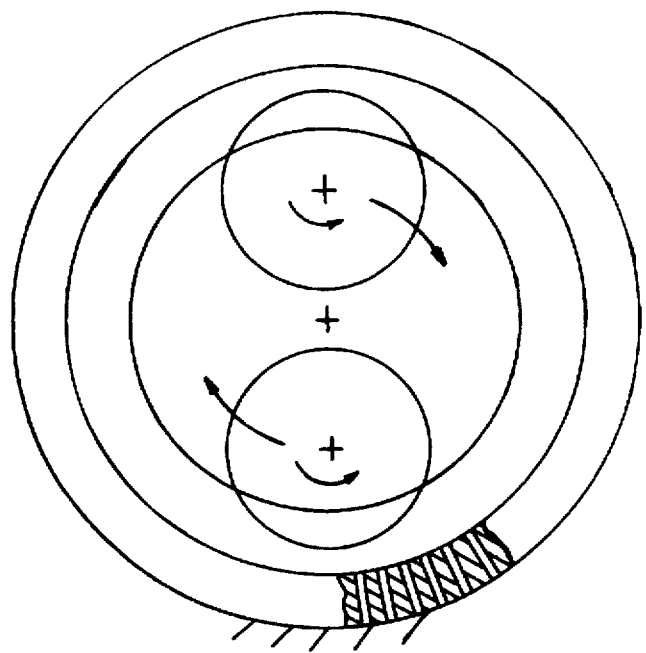

A simple construction of a pelleting press according to the invention comprises a driven roll and a driven die, the yoke being fixedly mounted in respect of the casing (FIG. 3). Another possibility is a press having a stationary mounted die, a driven yoke, and a roll driven in respect of this yoke (FIG. 4).

According to the invention the die 1 and the roll 6 (as the case may be also by means of a driven yoke) can each be driven in such a manner that the circumferential speed of the roll and the die in the narrowest part of the gap can be continuously variably adjustable independently from each other.

Then these adjustable drives can be mutually coupled in such a manner that the ratio between both velocities when varying these velocities is constant but is variable in function of the gap height. When controlling these adjustments, use can be made of relationships which can be derived from the mechanical equilibrium condition. These relationships can be approximately functional and may be simplified and possibly experimentally determined. Of course use can be made of an adapted microprocessor. The condition for control is that the drive of the press should be so that the shear stresses $\tau_m$ and $\tau_r$ are substantially equal.

The integral of the shear stresses $\tau_m$ or $\tau_r$ over the circumference and width (in the gap in question) of the die or the roll is a measure for the respective circumferential force in respect of the die or roll. Since, in a gap, the shear stress at the roll and die should substantially be equal this means that the circumferential force of the roll should be substantially equal to the cirumferential force of the die at a gap in question. This means that the press according to the invention can be controlled on the basis of the circumferential force or the driving torque. For, by multiplying the radius $R_r$ of the roll or $R_m$ of the die by the respective circumferential force the driving torque for each gap of the roll and the die respectively is obtained. The press according to the invention can, therefore, be controlled in such a manner that the quotient of the driving torque of the roll and the roll radius $R_r$ will be substantial equal to the driving torque of the die for each gap and the respective radius $R_m$ of the die.

Since the slip between the roll and the die is relatively small, the circumferential velocities of the roll and the die will be substantially equal. As the product of the circumferential speed and the circumferential force is equal to the power, this means that the power mechanically supplied to a roll should be substantially equal to the mechanical power which is supplied to the portion of the die co-operating with this roll. The press according to the invention can, therefore, be controlled also in such a manner that the mechanical power supplied to the roll is substantially equal to the power of the portion of the die co-operating with this roll.

Therefore the press can be controlled, in addition to other variables, on the basis of velocity, driving torque or power.

Controlling the press on the basis of velocity, driving torque or power can be realized in many ways by means of known techniques. Some examples thereof shall be mentioned now.

If the drive of the roll and the die takes place hydraulically by means of hydromotors, the velocity or number of revolutions of the roll and the die can be adjusted for instance by controlling the volume flow towards the hydromotors in question. If control takes place on the basis of driving torque or hydraulic power, information in respect of the hydraulic pressure or the hydraulic pressure and the rotational speed respectively will be sufficient.

In the case of a mechanical drive the velocity of the roll and the die can be adjusted by controlling the rotational speed of the roll and the die, for instance by means of a continuously variable mechanical transmission.

In the case of controlling on the basis of the drive torque or power, use can, for instance, be made of strain gauges on the drive shaft for determining the driving torque.

In the case of an electrical drive of the roll and the die, the velocity can be adjusted by controlling the rotational speed of the roll and the die (e.g. by frequency control). If control takes place on the basis of driving torque or power, a measurement of electrical magnitudes such as voltage (V), current intensity (A) and electrical power (kW) provide sufficient information.

It will be clear that various combinations are possible.

These adjustable drives can be mutually coupled in such a manner that the ratio between both velocities when varying the latter will be constant but variable in gap height. For controlling these adjustments, use can be made of relationships derived from mechanical equilibrium conditions, which may be simplified approximate functional relationships and/or experimentally determined relationships. Of course use can be made of an adapted microprocessor. The condition for control is that the drive of the press should be so that the shear stresses $\tau_m$ and $\tau_r$ are substantially equal.

It will be clear that the invention is not restricted to the embodiment shown, and that it can also be used in the case of substantially plane disc-shaped dies.

We claim:

1. A pelleting press for pressing compacted rod-shaped pellets from supplied powdery, granular or pasty material, comprising:

a die (1) having a configuration of a hollow circular drum rotatable about a rotation axis coinciding with its axis of symmetry, said die having an inner surface and an outer surface, each surface being a respective uniform distance from the axis of rotation, said die defining a plurality of extrusion apertures extending generally radially from the inner surface to the outer surface;

at least one roll (6), said roll having an outer surface and being rotatable about a rotation axis coinciding with its axis of symmetry and parallel to the rotation axis of said die, said roll being disposed adjacent the inner surface of said die, the outer surface of said roll and the inner surface of said die converging to define a compacting gap (7) having a compacting gap height (9);

means for supplying material (8) to be pressed within said compacting gap (7);

supporting means for supporting said die (1) and said at least one roll (6), said supporting means being controllably adjustable to vary the compacting gap height (9) during the operation of the pelleting press; and driving means for rotating said die (1) and said at least one roll (6), said driving means being adapted to impart to said die (1) and to said at least one roll (6) respective circumferential velocities each of which is continuously and independently variable by said driving means.

2. The press as defined by claim 1, wherein the circumferential velocity imparted to said die (1) and that imparted to said at least one roll (6) has a ratio therebetween, the ratio being variable by said driving means as a function of the compacting gap height (9).

3. The press as defined by claim 2, wherein said supporting means further comprises a yoke rotatable by said driving means about a rotation axis coincident with the rotation axis of said die (1), said at least one roll (6) being rotatably mounted on said yoke and being rotatable by said driving means, said at least one roll (6) being revolved along the inner surface of said die (1) as said yoke is rotated, the outer surface of said at least one roll (6) being separated from the inner surface of said die (1) by the compacting gap (7).

4. The press as defined by claim 1, wherein the circumferential velocities of said die (1) and said at least one roll (6) are varied by said driving means such that shear stresses exerted by said die (1) and said at least one roll (6) on the supplied material as it is forced through the compacting gap (7) are substantially equal.

5. The press as defined by claim 3 wherein circumferential forces applied by said driving means to said die and to said at least one roll rotatably mounted on said yoke are substantially equal.

6. The press as defined by claim 1, wherein each of the respective circumferential velocities of said die (1) and said at least one roll (6) is continuously and independently variable during operation of the pelleting press.

* * * * *